United States Patent
Wang

(10) Patent No.: US 9,791,611 B2
(45) Date of Patent: Oct. 17, 2017

(54) BACKLIGHT MODULE, LIQUID CRYSTAL PANEL AND DISPLAY DEVICE

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 124 days.

(21) Appl. No.: 14/234,724

(22) PCT Filed: Jun. 20, 2013

(86) PCT No.: PCT/CN2013/077536
§ 371 (c)(1),
(2) Date: Jan. 24, 2014

(87) PCT Pub. No.: WO2014/131255
PCT Pub. Date: Sep. 4, 2014

(65) Prior Publication Data
US 2015/0192726 A1    Jul. 9, 2015

(30) Foreign Application Priority Data
Mar. 1, 2013    (CN) .......................... 2013 1 0066470

(51) Int. Cl.
*G02F 1/1335*    (2006.01)
*F21V 8/00*    (2006.01)

(52) U.S. Cl.
CPC ......... *G02B 6/0028* (2013.01); *G02B 6/0066* (2013.01); *G02F 1/13362* (2013.01);
(Continued)

(58) Field of Classification Search
CPC .................... G02F 1/133615; G02B 6/0068
See application file for complete search history.

(56) References Cited

U.S. PATENT DOCUMENTS 7,773,849 B2 *    8/2010    Shani ............................ 385/131
9,028,123 B2 *    5/2015    Nichol et al. ................. 362/603
(Continued)

FOREIGN PATENT DOCUMENTS

CN    1779518 A    5/2006
CN    1908767 A    2/2007
(Continued)

OTHER PUBLICATIONS

First Office Action issued by the Chinese Patent Office for Chinese Patent Application No. 201310066470.3 dated Aug. 26, 2014, 5pgs.
(Continued)

*Primary Examiner* — Kendrick Hsu
(74) *Attorney, Agent, or Firm* — Ladas & Parry LLP

(57) ABSTRACT

The embodiments of the present invention disclose a backlight module, a liquid crystal panel and a display device. The backlight module comprises: a light guide plate (5), a plurality of polarization-maintaining optical fibers (3) and a plurality of monochrome laser light sources (1) provided at a lateral portion of the light guide plate (5). The polarization-maintaining optical fibers (3) receive the monochromatic light emitted from the monochrome laser light sources (1) respectively, and transmit the monochromatic light into the light guide plate (5).

14 Claims, 2 Drawing Sheets

(52) U.S. Cl.
CPC .. *G02F 1/133524* (2013.01); *G02F 1/133528* (2013.01); *G02F 1/133615* (2013.01); *G02F 1/133621* (2013.01); *G02B 6/0068* (2013.01)

(56) References Cited

U.S. PATENT DOCUMENTS

| | | | |
|---|---|---|---|
| 2006/0104093 | A1 | 5/2006 | Feng et al. |
| 2007/0030690 | A1 | 2/2007 | Lester |
| 2010/0073600 | A1* | 3/2010 | Itoh .................. G02B 6/0028 349/65 |
| 2010/0195022 | A1 | 8/2010 | Shikii et al. |
| 2010/0214208 | A1* | 8/2010 | Itoh .................. G02B 6/0001 345/102 |
| 2010/0277951 | A1* | 11/2010 | Kim et al. .................. 362/626 |

FOREIGN PATENT DOCUMENTS

| | | |
|---|---|---|
| CN | 101743510 A | 6/2010 |
| CN | 10273167 A | 5/2011 |
| CN | 102818220 A | 12/2012 |
| CN | 103123076 A | 5/2013 |

OTHER PUBLICATIONS

English translation for First Office Action issued by the Chinese Patent Office for Chinese Patent Application No. 201310066470.3 dated Aug. 26, 2014, 5pgs.

The State Intellectual Property Office of the People's Republic of China ("SIPO") (Chinese language) second office action dated Jan. 14, 2015 by SIPO in Chinese Patent Application 201310066470.3. Nine (9) pages.

English Translation of The State Intellectual Property Office of the People's Republic of China. ("SIPO") (Chinese language) second office action dated Jan. 14, 2015 by SIPO in Chinese Patent Application 201310066470.3. Eight (8) pages.

International Search Report for International Application No. PCT/CN2013/077536, 15pgs.

International Preliminary Report on Patentability Appln. No. PCT/CN2013/077536; Dated Sep. 1, 2015.

\* cited by examiner

BACKLIGHT MODULE, LIQUID CRYSTAL PANEL AND DISPLAY DEVICE

CROSS REFERENCE TO RELATED APPLICATIONS

This application is based on International Application No. PCT/CN2013/077536 filed on Jun. 20, 2013, which claims priority to Chinese National Application No. 201310066470.3 filed on Mar. 1, 2013, the contents of which are incorporated herein by reference.

FIELD OF THE INVENTION

Embodiments of the present invention relate to a backlight module, a liquid crystal panel and a display device.

BACKGROUND OF THE INVENTION

In a conventional liquid crystal display panel, mostly a white-light-emitting device which emits a continuous spectrum is used as a backlight source, and a polarizer at a lower portion of the liquid crystal panel is used to obtain light linearly-polarized in a single direction, and a color filter (CF) at an upper portion of the liquid crystal panel is used to obtain light of three primary colors, i.e. red, green and blue (RGB), whereby achieving display of various colors within a color gamut. This method will cause the light waves of the natural light in a direction perpendicular to the polarization direction of the polarizer to be filtered, and in the meantime, the filter only allows light of a single color to be emitted, which results in further loss of the backlight. Therefore, there is a need to provide a new backlight mode which does not need a polarizer or a color filter.

SUMMARY OF THE INVENTION

The object of the present invention is to provide a backlight module with a simple structure and high utilization-efficiency of backlight.

To solve the above-mentioned technical problem, embodiments of the present invention provide a backlight module, which comprises: a light guide plate, a plurality of polarization-maintaining optical fibers (PMF or PM fibers) and a plurality of monochrome laser light sources provided at a lateral portion of the light guide plate, wherein the polarization-maintaining optical fibers receive the monochromatic light emitted from the monochrome laser light sources respectively, and transmit the monochromatic light into the light guide plate.

For example, a beam-expanding coupler is provided between the polarization-maintaining optical fibers and the monochrome laser light sources, and the monochromatic light emitted from the monochrome laser light sources is respectively transmitted through the beam-expanding coupler to the corresponding polarization-maintaining optical fibers.

For example, the lateral portion of the light guide plate is provided with light inlet channels corresponding to pixels.

For example, an optical-fiber-coupler array is provided between the polarization-maintaining optical fibers and the light guide plate, so as to arrange the monochromatic light transmitted by the polarization-maintaining optical fibers and then transmit it to the light inlet channel.

For example, the polarization-maintaining optical fibers are arranged cyclically on the optical-fiber-coupler array, in the order of red, green and blue, according to the colors of the monochromatic light transmitted by them.

For example, the light guide plate is provided thereon with a total reflection surface, and the total reflection surface can totally reflect the monochromatic light to a pixel region.

a height of the total reflection surface increases as a distance from the total reflection surface to the light-incident side for the monochromatic light increases.

According to another aspect of the present invention, a liquid crystal panel is further provided, which comprises a backlight module as any one of those described above.

According to yet another aspect of the present invention, a display device is further provided, which comprises a liquid crystal panel as described above.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
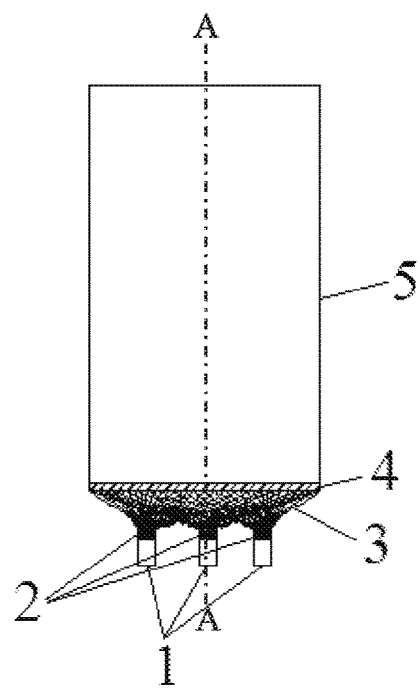
FIG. 1 is a schematic structural view of a backlight module according to one exemplary embodiment of the present invention.
Figure 2:
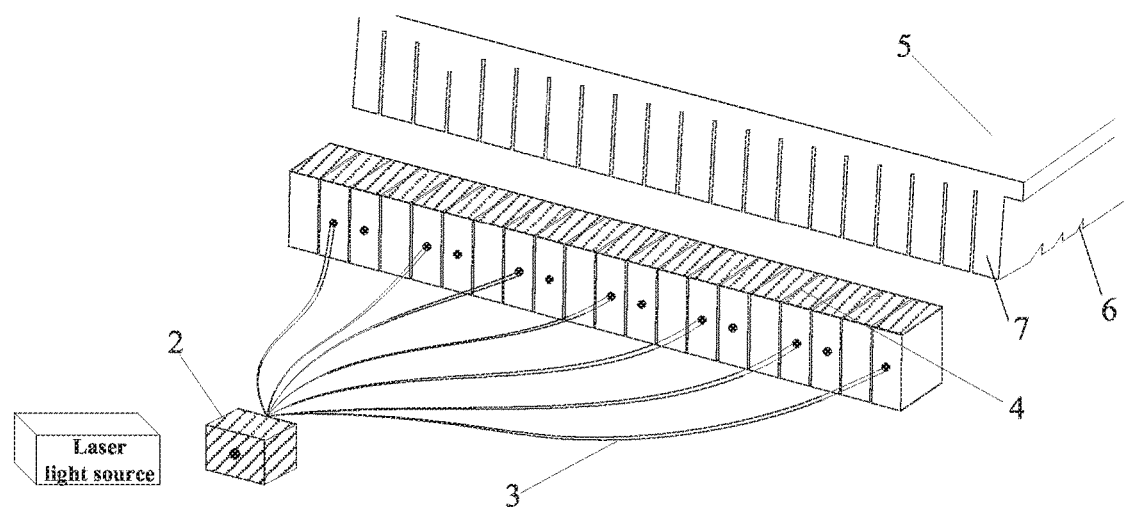
FIG. 2 is a schematic exploded view of the backlight module shown in FIG. 1.
Figure 3:
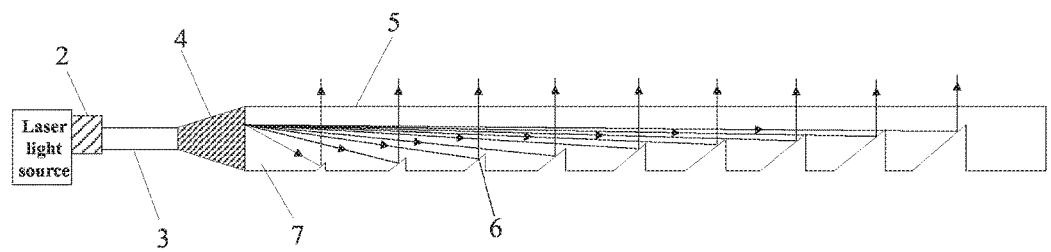
FIG. 3 is a sectional view of the backlight module shown in FIG. 1 taken along line A-A.

Referring to FIG. 1 to FIG. 3, the backlight module of the illustrated embodiment comprises: a light guide plate 5, a plurality of polarization-maintaining optical fibers 3 and a plurality of monochrome laser light sources 1 provided at a lateral portion of the light guide plate 5. The number of the monochrome laser light sources 1 is determined according to the number of sub-pixels of a pixel, and in this embodiment, there are three monochrome laser light sources 1, which emit monochromatic light of three colors, i.e., red, green and blue, respectively, and are provided at the same lateral portion of the light guide plate 5. The plurality of polarization-maintaining optical fibers 3 receive the monochromatic light of three colors, i.e., red, green and blue, emitted from the monochrome laser light sources 1, respectively, and transmit the monochromatic light into the light guide plate 5.

The lateral portion of the light guide plate 5 near the plurality of monochrome laser light sources 1 is provided with light inlet channels 7 corresponding to pixels; the monochromatic light passes through the light inlet channels 7 and enters into the light guide plate 5, and after total reflection by a total reflection surface on the light guide plate 5, it is emitted orthogonally from the light exit surface of the light guide plate 5.

In the backlight module described above, the three monochrome laser light sources 1 emit monochromatic light of three colors, i.e., red, green and blue, respectively; compared to a conventional light source like a cold cathode fluorescent lamp (CCFL) and a light emitting diode (LED), such monochromatic light has better monochromaticity and is excellent linearly-polarized light. The monochromatic light of each color is transmitted by the plurality of polarization-maintaining optical fibers 3, respectively, which can effectively maintain the monochromaticity and polarization state of the linearly-polarized light emitted from the monochrome laser light sources 1. The monochromatic light of three colors transmitted by the polarization-maintaining optical fibers 3, passes through the light inlet channels 7 provided at a lateral portion of the light guide plate 5, and enters into the light guide plate 5. The light guide plate 5 is made of a material which has good light-guide performance and a high refractive index, such as glass, quartz and the like. The light inlet channels 7 carve the lateral portion of the light guide plate 5 into a plurality of regions, each region corresponding to one polarization-maintaining optical fiber 3, so that the monochromatic light transmitted by the polarization-maintaining optical fibers 3 passes through the light inlet channels 7 into the light guide plate 5. The monochromatic light having entered into the light guide plate 5, undergoes total reflection on the total reflection surface on the bottom surface of the light guide plate 5, and then it is emitted orthogonally from the light exit surface of the light guide plate 5; the finally emitted light is polarized light of three colors, i.e., red, green and blue, which can be directly utilized by a liquid crystal display, without the need of a bottom polarizer and a color filter.

To improve the utilization-efficiency of the monochromatic light emitted from the monochrome laser light sources 1, in this embodiment, a beam-expanding coupler 2 is further provided between the polarization-maintaining optical fibers 3 and the monochrome laser light sources 1. There are three beam-expanding couplers 2, which are connected to the three monochrome laser light sources 1, respectively, so that the monochromatic light emitted from the monochrome laser light sources 1 is beam-expanded through the beam-expanding couplers 2 and thereafter transmitted to the corresponding plurality of polarization-maintaining optical fibers 3, respectively. The number of the polarization-maintaining optical fibers 3 may be determined according to the size of the light guide plate 5 and the set number of the light inlet channels 7.

Further, between the polarization-maintaining optical fibers 3 and the light guide plate 5, there may be provided with an optical-fiber-coupler array 4. The optical-fiber-coupler array 4 is located at one side of the light inlet channels 7, so as to arrange the monochromatic light transmitted by the polarization-maintaining optical fibers 3 and then transmit it to the light inlet channels 7. In this embodiment, there is one optical-fiber-coupler array 4. On the optical-fiber-coupler array 4, the polarization-maintaining optical fibers 3 are arranged cyclically in the order of red, green and blue, according to the colors of the monochromatic light transmitted by them. Through the optical-fiber-coupler array 4, the monochromatic light transmitted by the polarization-maintaining optical fibers 3 is introduced into the light inlet channels 7.

As the monochromatic light passes through the light inlet channels 7 into the light guide plate 5, its transmission direction is approximately parallel to the light exit surface of the light guide plate 5. To make the finally emitted light of the backlight module orthogonal to the light exit surface of the light guide plate 5, the bottom surface of the light guide plate 5 is cut to form V-shaped grooves 6 with their openings facing away from the light exit surface. The side-wall of the V-shaped groove 6 facing the light incident direction is a total reflection surface and thus this side-wall is provided as an inclined surface with the inclination angle being determined according to the light incident direction, whereas the other side-wall may be provided as a vertical or inclined surface. The V-shaped groove 6 can maintain the polarization direction of the linearly-polarized light, and by adjusting the height and density of the V-shaped grooves 6, the monochromatic light can be totally reflected to a pixel region. Preferably, the height of the V-shaped grooves 6 will be increased as a distance from the grooves 6 to the light-incident side of the monochromatic light, so that the light within the light inlet channels 7 can be emitted evenly and orthogonally from the light exit surface of the light guide plate.

The above-described backlight module, which directly utilizes a monochrome laser light source, can improve the chroma of the light of three colors, i.e., red, green and blue.

Figure 4:
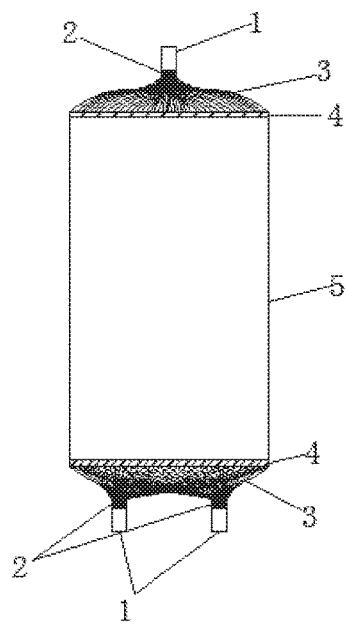
FIG. 4 is a schematic structural view of a backlight module according to another exemplary embodiment of the present invention.

FIG. 4 illustrates a backlight module according to another embodiment of the present invention, and the structure of the backlight module is similar to that of the backlight module shown in FIG. 1 to FIG. 3, with the difference lies in that the three monochrome laser light sources 1 are provided at the two opposite lateral portions of the light guide plate 5. Accordingly, beam-expanding couplers 2, polarization-maintaining optical fibers 3 and optical-fiber-coupler arrays 4, which are all provided corresponding to the monochrome laser light sources 1, are also locate at the two opposite lateral portions of the light guide plate 5, respectively; and both of the two side-walls of the V-shaped groove 6 for total reflection of light are provided as an inclined total reflection surface, so as to achieve that the linearly-polarized light of three colors, i.e., red, green and blue is emitted orthogonally from the light exit surface of the light guide plate 5, and corresponds to the red, green and blue pixels of the liquid crystal panel.

In addition, in another embodiment of the present invention, there is further provided a liquid crystal panel, which comprises a backlight module as described above. With the use of such a backlight module, a bottom polarizer and a color filter in a conventional backlight module can be omitted; and by directly utilizing the backlight module as described above, a polarized backlight source corresponding to the red, green and blue pixels of the liquid crystal panel can be obtained with a simple structure.

In addition, in yet another embodiment of the present invention, there is provided a display device, which is made with the above-described backlight module or liquid crystal panel. The display device may be any product or component which has a display function, such as a liquid crystal panel, an electronic paper, an OLED panel, a liquid crystal TV, a liquid crystal display, a digital photo frame, a mobile phone, a tablet computer, etc.

In the backlight module, liquid crystal panel and display device provided in accordance with the above embodiments, by using monochrome laser light sources to emit light, using polarization-maintaining optical fibers to transmit the light, and using a light guide plate for total reflection of the light, a polarized backlight source corresponding to the red, green and blue pixels of the liquid crystal panel can be obtained, without the need of a bottom polarizer or a color filter, thereby achieving a simple structure. Since the light sources emit polarized light, the transmittance of the liquid crystal panel is improved, and the utilization-efficiency of the light is enhanced. Further, since the light sources use laser, of which the color gamut, color chroma and color fidelity are much better than those of the backlight source used in a conventional liquid crystal display system, so the display quality of the display device can be improved.

The above description is merely the preferred implementations of the present invention. It should be noted that, for the ordinary skilled in the art, improvements and replacements can be made without departing from the technical principles of the invention, also these improvements and replacements should be regarded as within the scope of the invention.

What is claimed is:

1. A backlight module comprising: a light guide plate, a plurality of polarization-maintaining optical fibers and a plurality of monochrome laser light sources provided at a lateral portion of the light guide plate,
   wherein the polarization-maintaining optical fibers receive the monochromatic light emitted from the monochrome laser light sources respectively and transmit the monochromatic light into the light guide plate, and each of the polarization-maintaining optical fibers receives and transmits the monochromatic light of only one color,
   wherein the lateral portion of the light guide plate is provided with light inlet channels corresponding to pixels, the light inlet channels carve the lateral portion of the light guide plate into a plurality of regions, each region corresponding to one polarization-maintaining optical fiber,
   wherein the plurality of monochrome laser light sources and the light inlet channels of the light guide plate are provided on a same side of the light guide plate, wherein the plurality of monochrome laser light sources are respectively provided at two opposite lateral portions of the light guide plate without being provided on other lateral portions of the light guide plate than the two opposite lateral portions, a bottom surface of the light guide plate is provided with a plurality of V-shaped grooves, openings of the plurality of V-shaped grooves face away from a light exit surface of the light guide plate, and two side-walls of the plurality of V-shaped grooves that face a light incident direction are both provided as an inclined total reflection surface.

2. The backlight module according to claim 1, wherein, a beam-expanding coupler is provided between the polarization-maintaining optical fibers and the monochrome laser light sources, and the monochromatic light emitted from the monochrome laser light sources is respectively transmitted through the beam-expanding coupler to the corresponding polarization-maintaining optical fibers.

3. The backlight module according to claim 2, wherein, an optical-fiber-coupler array is provided between the polarization-maintaining optical fibers and the light guide plate, so as to arrange the monochromatic light transmitted by the polarization-maintaining optical fibers and then transmit it to the light inlet channel.

4. The backlight module according to claim 3, wherein, the polarization-maintaining optical fibers are arranged cyclically on the optical-fiber-coupler array, in the order of red, green and blue, according to the colors of the monochromatic light transmitted by them.

5. The backlight module according to claim 1, wherein, an optical-fiber-coupler array is provided between the polarization-maintaining optical fibers and the light guide plate, so as to arrange the monochromatic light transmitted by the polarization-maintaining optical fibers and then transmit it to the light inlet channel.

6. The backlight module according to claim 5, wherein, the polarization-maintaining optical fibers are arranged cyclically on the optical-fiber-coupler array, in the order of red, green and blue, according to the colors of the monochromatic light transmitted by them.

7. The backlight module according to claim 5, wherein, the optical-fiber-coupler array comprises a plurality of rectangular blocks, one rectangular block is connected with one polarization-maintaining optical fiber.

8. The backlight module according to claim 1, wherein, a height of the total reflection surface increases as a distance from the total reflection surface to the light-incident side for the monochromatic light increases.

9. A liquid crystal panel, comprising a backlight module, wherein the backlight module comprises: a light guide plate, a plurality of polarization-maintaining optical fibers and a plurality of monochrome laser light sources provided at a lateral portion of the light guide plate,
   wherein the polarization-maintaining optical fibers receive the monochromatic light emitted from the monochrome laser light sources respectively and transmit the monochromatic light into the light guide plate, and each of the polarization-maintaining optical fibers receives and transmits the monochromatic light of only one color,
   wherein the lateral portion of the light guide plate is provided with light inlet channels corresponding to pixels, the light inlet channels carve the lateral portion of the light guide plate into a plurality of regions, each region corresponding to one polarization-maintaining optical fiber,
   wherein the plurality of monochrome laser light sources and the light inlet channels of the light guide plate are provided on a same side of the light guide plate, wherein the plurality of monochrome laser light sources are respectively provided at two opposite lateral portions of the light guide plate without being provided on other lateral portions of the light guide plate than the two opposite lateral portions, a bottom surface of the light guide plate is provided with a plurality of V-shaped grooves, openings of the plurality of V-shaped grooves face away from a light exit surface of the light guide plate, and two side-walls of the plurality of V-shaped grooves that face a light incident direction are both provided as an inclined total reflection surface.

10. The liquid crystal panel according to claim 8, wherein, a beam-expanding coupler is provided between the polarization-maintaining optical fibers and the monochrome laser light sources, and the monochromatic light emitted from the monochrome laser light sources is respectively transmitted through the beam-expanding coupler to the corresponding polarization-maintaining optical fibers.

11. The liquid crystal panel according to claim 9, wherein, an optical-fiber-coupler array is provided between the polarization-maintaining optical fibers and the light guide plate, so as to arrange the monochromatic light transmitted by the polarization-maintaining optical fibers and then transmit it to the light inlet channel.

12. The liquid crystal panel according to claim 11, wherein, the polarization-maintaining optical fibers are arranged cyclically on the optical-fiber-coupler array, in the order of red, green and blue, according to the colors of the monochromatic light transmitted by them.

13. A display device, comprising a liquid crystal panel, wherein the liquid crystal panel, comprises a backlight module, wherein the backlight module comprises: a light guide plate, a plurality of polarization-maintaining optical fibers and a plurality of monochrome laser light sources provided at a lateral portion of the light guide plate, wherein the polarization-maintaining optical fibers receive the monochromatic light emitted from the monochrome laser light sources respectively and transmit the monochromatic light into the light guide plate, and each of the polarization-maintaining optical fibers receives and transmits the monochromatic light of only one color, wherein the lateral portion of the light guide plate is provided with light inlet channels corresponding to pixels, the light inlet channels carve the lateral portion of the light guide plate into a plurality of regions, each region corresponding to one polarization-maintaining optical fiber, wherein the plurality of monochrome laser light sources and the light inlet channels of the light guide plate are provided on a same side of the light guide plate, wherein the plurality of monochrome laser light sources are respectively provided at two opposite lateral portions of the light guide plate without being provided on other lateral portions of the light guide plate than the two opposite lateral portions, a bottom surface of the light guide plate is provided with a plurality of V-shaped grooves, openings of the plurality of V-shaped grooves face away from a light exit surface of the light guide plate, and two side-walls of the plurality of V-shaped grooves that face a light incident direction are both provided as an inclined total reflection surface.

14. The liquid crystal panel according to claim 9, wherein, a height of the total reflection surface increases as a distance from the total reflection surface to the light-incident side for the monochromatic light increases.

* * * * *